United States Patent
Calder et al.

(10) Patent No.: US 8,613,398 B2
(45) Date of Patent: Dec. 24, 2013

(54) APPARATUS AND METHODS FOR LINEAR ACTUATION OF FLOW ALTERING COMPONENTS OF JET ENGINE NOZZLE

(75) Inventors: David Patrick Calder, Nottingham, MD (US); Pupinder Bhutiani, Glenwood, MD (US)

(73) Assignee: General Electric Company, Schenectady, NY (US)

(*) Notice: Subject to any disclaimer, the term of this patent is extended or adjusted under 35 U.S.C. 154(b) by 229 days.

(21) Appl. No.: 13/163,463

(22) Filed: Jun. 17, 2011

(65) Prior Publication Data
US 2012/0321456 A1 Dec. 20, 2012

(51) Int. Cl.
*B63H 11/10* (2006.01)
*F02K 1/00* (2006.01)

(52) U.S. Cl.
USPC ............... 239/265.19; 60/771; 181/215

(58) Field of Classification Search
USPC ......... 60/770, 771, 39.5; 239/265.19, 265.39; 181/213, 215
See application file for complete search history.

(56) References Cited

U.S. PATENT DOCUMENTS

| | | | |
|---|---|---|---|
| 3,449,914 A * | 6/1969 | Brown | 405/215 |
| 3,829,020 A | 8/1974 | Sterns | |
| 3,931,708 A | 1/1976 | Motycka | |
| 6,070,407 A | 6/2000 | Newton | |
| 6,318,070 B1 | 11/2001 | Rey et al. | |
| 6,718,752 B2 | 4/2004 | Nesbitt et al. | |
| 6,735,936 B2 | 5/2004 | Rey et al. | |
| 6,983,588 B2 | 1/2006 | Lair | |
| 7,004,047 B2 | 2/2006 | Rey et al. | |
| 7,178,338 B2 | 2/2007 | Whurr | |
| 7,216,831 B2 * | 5/2007 | Wood | 244/99.8 |
| 7,340,883 B2 * | 3/2008 | Wood et al. | 60/226.1 |
| 7,458,221 B1 | 12/2008 | Arnold et al. | |
| 2008/0000235 A1 | 1/2008 | Hanson | |
| 2008/0069687 A1 | 3/2008 | Lace | |

(Continued)

FOREIGN PATENT DOCUMENTS

| | | |
|---|---|---|
| EP | 1619376 A2 | 1/2006 |
| GB | 2372779 A | 9/2002 |
| WO | 2006055217 A1 | 5/2006 |
| WO | 2010015751 A1 | 2/2010 |

OTHER PUBLICATIONS

EP Search Report dated Jul. 24, 2013 from corresponding EP Application No. 12172297.9.

*Primary Examiner* — Gerald L Sung
*Assistant Examiner* — Scott Walthour
(74) *Attorney, Agent, or Firm* — Global Patent Operation; Vivek P. Shankam

(57) ABSTRACT

A trans cowl for a jet engine includes a chevron coupled with a linear actuators. The chevron is movable by the linear actuator forward or aft to change a gas flow path formed by an core cowl and thrust reverser translating cowl. In a first position, the chevrons are disposed substantially parallel the gas flow path to attenuate drag and/or loss of engine thrust. In a second position, the chevrons are moved aft to project, or further project, into the gas flow path. In one embodiment, the linear actuator comprises a first component that is coupled with the outer cowl. A second component of the linear actuator is coupled with the chevron. When installed, the linear actuator can be coupled with a controller and an electrical power source. A position sensor coupled with the controller senses a position of the linear actuator and/or the chevron.

19 Claims, 16 Drawing Sheets

(56) References Cited

U.S. PATENT DOCUMENTS

| | | |
|---|---|---|
| 2008/0120979 A1* | 5/2008 | Wood et al. ................ 60/770 |
| 2008/0163606 A1 | 7/2008 | Cini et al. |
| 2008/0190095 A1 | 8/2008 | Baran |
| 2008/0302907 A1 | 12/2008 | Schafer |
| 2009/0053058 A1 | 2/2009 | Kohlenberg et al. |
| 2009/0064659 A1 | 3/2009 | Alletzhauser |
| 2009/0094961 A1 | 4/2009 | Stern |
| 2010/0314194 A1* | 12/2010 | Guerin ........................ 181/215 |
| 2011/0139540 A1* | 6/2011 | Caruel et al. ................ 181/215 |

* cited by examiner

APPARATUS AND METHODS FOR LINEAR ACTUATION OF FLOW ALTERING COMPONENTS OF JET ENGINE NOZZLE

BACKGROUND

1. Technical Field

The subject matter of the present disclosure relates to jet engines generally, and more particularly to certain new and useful advances in the manufacture, maintenance and/or operation of a segmented, deployable fan nozzle to reduce jet engine noise and fuel consumption.

2. Description of Related Art

Large turbofan engines with variable flow-path geometry afford attractive economic incentives because they reduce fuel consumption and engine noise. However, such engines require use of variable area fan nozzles (VAFNs) to keep critical fan parameters, such as pressure, speed and flow, within acceptable limits. Conventional VAFN's typically employ structure known by the aircraft industry as "chevrons" to attenuate engine noise. Triangular in shape and fixed in place, such chevrons are typically positioned along an aft edge of a secondary exhaust nozzle of the jet engine so that the chevrons project into the gas flow stream. Although this arrangement has been proven to reduce jet engine noise, the chevrons cause drag and loss of thrust because they dip into the fan stream. Accordingly, this loss of thrust must be balanced with the need to reduce noise.

At least two types of VAFN's have been developed. VAFNs with hydraulically-actuated chevrons are well-known, but are heavy and expensive to maintain. VAFN's using chevrons actuated by shape memory alloys (SMA's), such as the SMA chevrons designed and tested for the Quiet Technology Demonstrator (QTD) I and II programs, offer improved noise reduction, but their high-performance alloys, such as Nickel Titanium (NiTinol), are expensive. In the QTD II test, each chevron had a laminate construction. Three SMA strips of NiTinol were positioned on a base chevron formed of a composite laminate—two along the chevron's angled edges, and one extending from the chevron's tip to its center—and then covered with a cover plate. The SMA strips, which deformed in response to heat, bent each chevron inward during takeoff to reduce community noise and cabin noise. During cruise, the SMA strips straightened each chevron to reduce fuel consumption. In both applications, the base of the chevrons containing the SMA strips were immovable—e.g., did not translate forward or aft.

U.S. Pat. No. 6,718,752 to Nesbitt et al. illustrates an example of such chevrons in FIG. 21. This illustration identifies a known variable area fan nozzle (VAFN) 2100 having flow altering components 2102 that are bent and straightened by shape memory alloy (SMA) actuators.

Thus, nozzle chevrons that bend or "rotate" into and out of the stream offer some improvement over the fixed chevrons, but are still a compromise relative to aerodynamic performance of the nozzle. Accordingly, further improvements are desired that allow the geometry of the nozzle and exit area to be optimized, while providing improved acoustic attenuation, thrust and/or fuel efficiency.

BRIEF DESCRIPTION OF THE INVENTION

Described herein are embodiments of new and useful apparatus and methods for linear actuation of flow altering components (also "chevrons") of a jet engine variable area fan nozzle (VAFN).

Each chevron is movable, either alone or in groups of chevrons, by one or more linear actuators forward or aft to change a diameter of a gas flow path formed in the jet engine. In a first position, the chevrons are disposed substantially parallel the gas flow path to attenuate drag and/or loss of engine thrust. In a second position, the chevrons are moved aft to project, or further project, into the gas flow path. For each linear actuator, a first component of the linear actuator is coupled with the airfoil; and a second component of the linear actuator is coupled with the corresponding chevron. When installed on an aircraft, each linear actuator is coupled with a controller and with an electrical power source. A position sensor coupled with the controller is configured to output data to the controller indicative of a position of the linear actuator and/or a position of the chevron.

Other features and advantages of the disclosure will become apparent by reference to the following description taken in connection with the accompanying drawings.

BRIEF DESCRIPTION OF THE DRAWINGS

Reference is now made briefly to the accompanying drawings, in which.

DETAILED DESCRIPTION OF THE INVENTION

Figure 1:
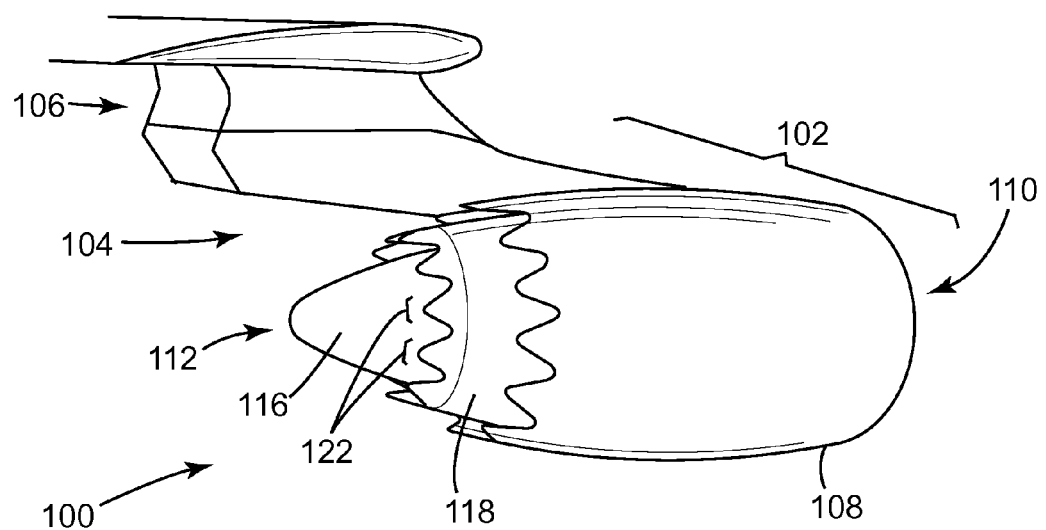
FIG. 1 is a perspective view of a jet engine.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

In brief, the present disclosure describes various embodiments of a chevron installation that can improve operating characteristics of a jet engine, when the jet engine is positioned within a cowl that comprises one or more linear actuators coupled with one or more chevrons. The chevron installation includes flow altering components, hereinafter "chevrons," and one or more linear actuators, which translate the chevrons forward (i.e., towards the inlet end of the jet engine cowl) and aft (i.e., towards the exhaust end of the jet engine cowl) to alter a fan nozzle exit area to reduce noise, improve acoustic performance, and to achieve optimal fan duct pressures at various points in the flight envelope. In one example, translating the chevrons changes dimensions of the fan nozzle exit area and, more particularly, positions the chevrons into the flow path of gases exiting the jet engine. For jet engines such as high bypass turbofan engines, use of the translating chevrons can optimize the bypass flow path nozzle size and promote acoustic attenuation.

The chevrons can translate individually or, in other examples, as groups or sections (e.g., quadrants) comprising two or more of the chevrons. Varying the location of the chevrons forward and aft individually or locally during flight (or during other inherent operations of the jet engine) can optimize the engine cycle/fan duct performance and acoustic performance. In one example, the chevron(s) can be treated and/or constructed (i.e. in one embodiment as Helmholtz resonators) to improve the acoustic properties, e.g., the overall effective acoustic area of the fan duct.

Examples of the actuator include linear actuators, although the chevron installation may incorporate other types as desired. The low-profile of the linear actuators minimizes the cross-section impact of the chevron installation on the overall aerodynamic envelope of the jet engine. Moreover, the accuracy of linear actuators allows precise positioning of the chevrons absent problems associated with other types of actuators, e.g., backlash issues common to rotary actuators and mechanical screws. One or more embodiments may also incorporate position sensing features (e.g., as part of the linear actuator) and/or an encoder mechanism to aid in the precise location of the chevron with respect to, e.g., the center line of the nozzle. Encoders are useful to provide relative position feedback. For example, encoders can be incorporated as part of linear actuators to identify relative positions of the rotor and stator.

While this disclosure contemplates a variety of constructions, in one example one or more of the chevrons may incorporate parts of the linear actuator as an integral part of the chevron. This configuration can help to eliminate redundancies in structure and assembly components. This feature can simplify the design and implementation and, in some aspects, permit jet engines to be outfit with the chevron(s) as part of servicing, maintenance, refurbishing or upgrading processes.

Some other features and advantages include one or more of the following and/or combinations thereof:

(1) The chevrons can be actuated in a manner that adjusts the fan duct nozzle cross-section area without inducing high torsional loads in a trailing edge of the thrust reverser translating cowl;

(2) Linear actuators are inherently stiff, and may be part of the structural load path of the translating chevron, resulting in weight efficiencies in the design;

(3) The use of actuators on individual chevrons permits tailoring of acoustic signature for specific conditions within a flight profile, (i.e. take-off, cruise or approach) providing improved acoustic attenuation;

(4) Use of linear actuators allows a simple design, free from mechanical linkages, bell cranks, etc. that tend to degrade with age, induce large chevron positioning tolerances and drive clearance and positioning issues within the translating cowl assembly;

(5) Use of linear actuators allows rapid and precise positioning of one or more chevrons; and (6) Some capability for thrust vectoring is achieved by controlling chevrons individually, or as selected groups.

Still other advantages and features will become apparent in connection with the various embodiments that the disclosure presents in the discussion that follows below.

Turning now to the figures, FIG. 1 depicts a schematic of a wing portion 100 of an aircraft that includes a jet engine 102, a pylon 104, and a wing 106. The jet engine 102 includes a nacelle 108, which functions as an outer casing for a turbine engine (not shown). The jet engine 102 has a forward end 110, at which air enters the turbine engine, and an aft end 112 from which the turbine engine expels combustion gases via, e.g., an exhaust nozzle. Near the aft end 112, the jet engine 102 comprises an inner cowl 116 (or "core cowl 116") and an outer cowl 118 (or "thrust reverser translating cowl 118"). Together the inner cowl 116 and the outer cowl 118 define a fan nozzle exit area. The outer cowl 118 can comprise a plurality of chevrons 122, which the present disclosure describes in connection with a flow nozzle/chevron installation (or "chevron installation").

Figure 2:
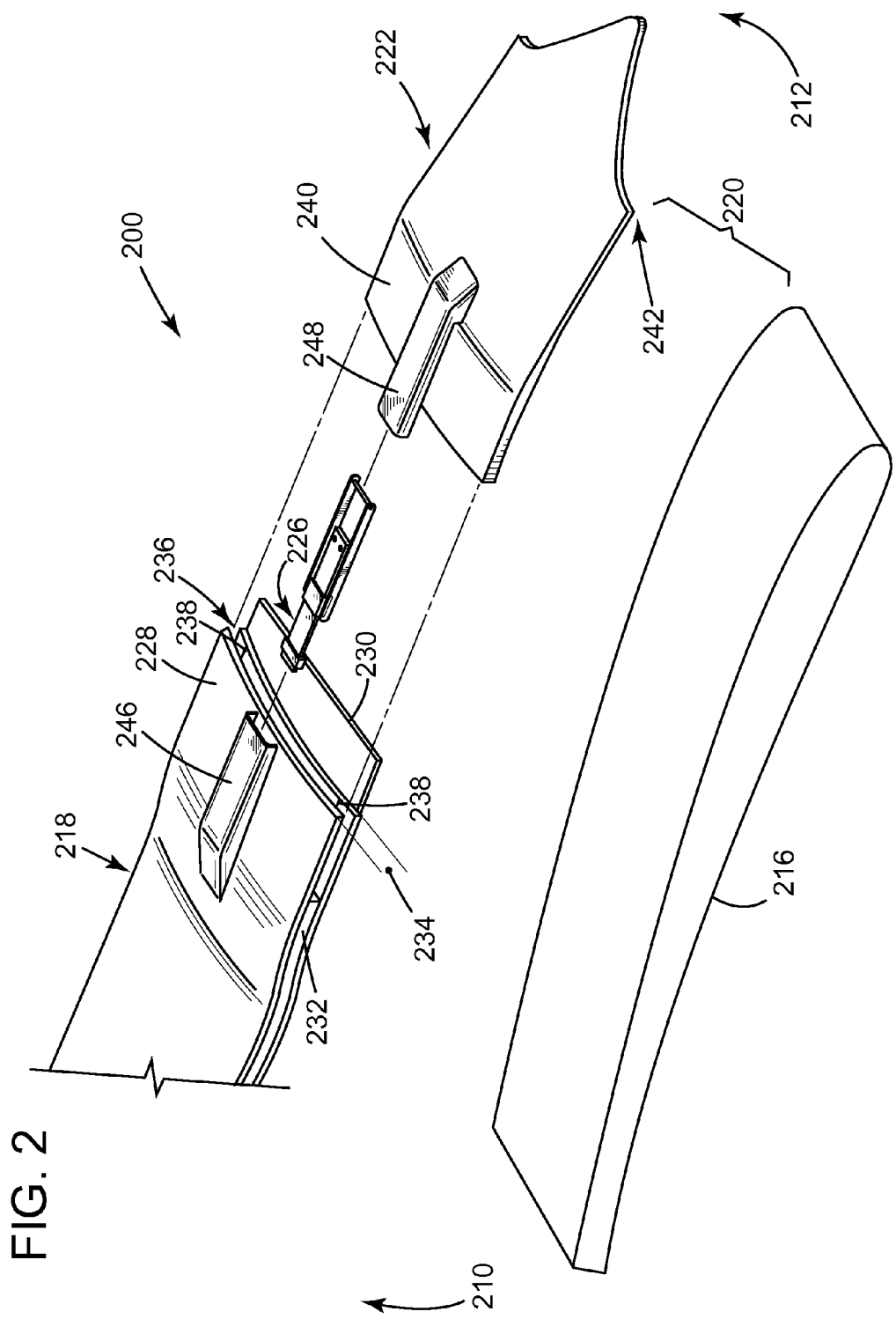
FIG. 2 is an exploded, perspective view of an embodiment of an apparatus configured to move a chevron forward or aft to alter a gas flow path of an airfoil for a jet engine.
Figure 3:
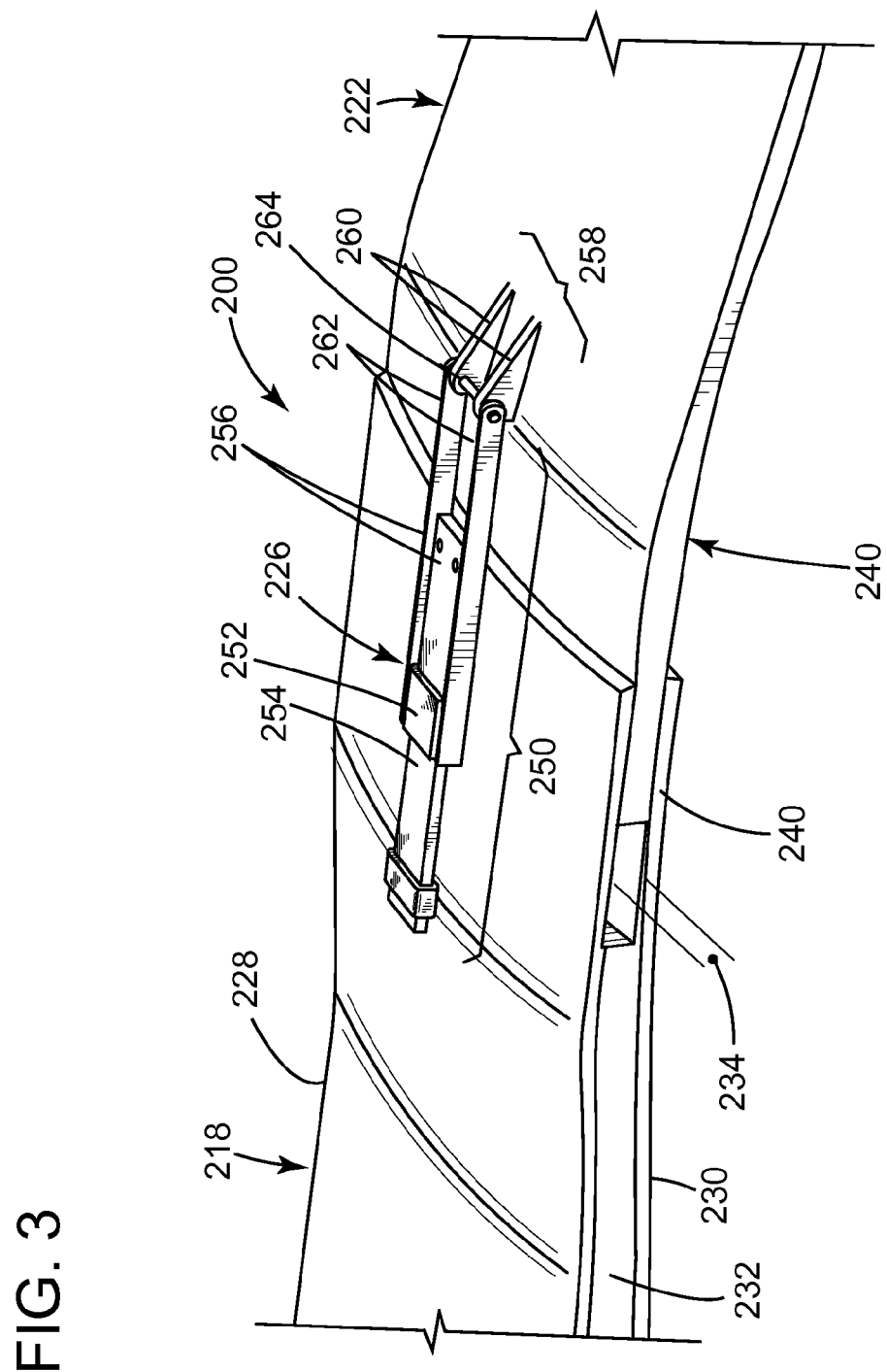
FIG. 3 is a perspective view of the embodiment of the apparatus of FIG. 2.

FIGS. 2, 3, 4, 5, and 6 depict in various forms one exemplary embodiment of an apparatus 200, which can be used as the chevron installation 122 (FIG. 1). FIG. 2 illustrates an exploded, perspective view of the apparatus 200, which is part of the jet engine 102, shown in FIG. 1 but much of which has been removed for clarity. For the present discussion, FIG. 2 identifies a forward end 210, an aft end 212, an inner cowl 216, an outer cowl 218, and a fan nozzle exit area 220. The chevron installation 200 includes a chevron 222 and an actuator assembly 226 that moves the chevron 222 forward and aft to alter, e.g., the size and dimensions of the fan nozzle exit area 220. FIG. 3 is a perspective view of the embodiment of the apparatus 200 of FIG. 2. Only a portion of the outer cowl 218 is shown in FIGS. 1 and 2, so that embodiments of the apparatus 200 may be more easily drawn, described and understood.

Figure 4:
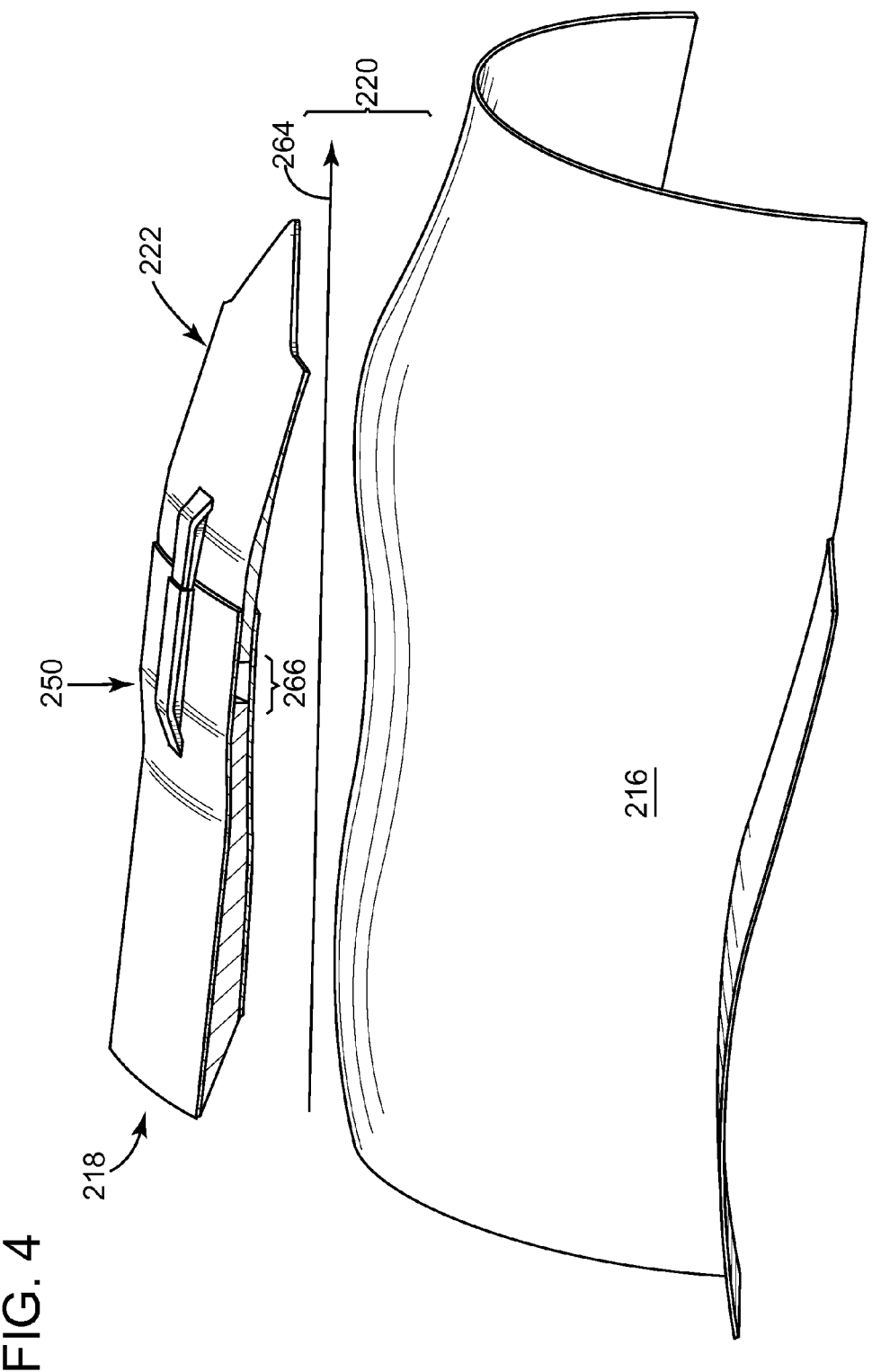
FIG. 4 is a perspective view of the embodiment of the apparatus of FIG. 2, showing the apparatus in a first (default) position and positioned relative to a core cowling of a jet engine.
Figure 5:
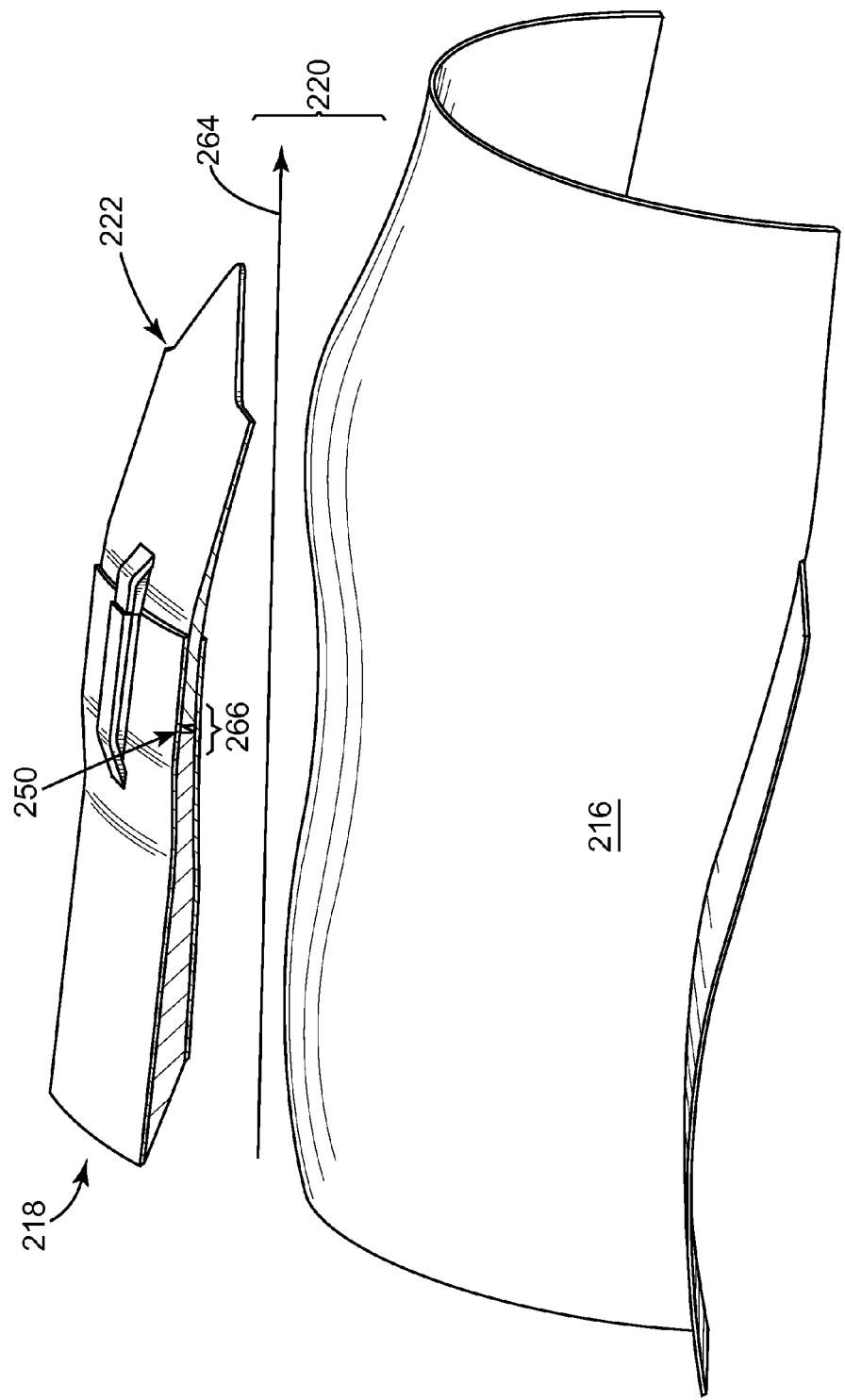
FIG. 5 is a perspective view of the embodiment of the apparatus of FIG. 2, showing the apparatus in a second (forward) position and positioned relative to the core cowling of the jet engine.
Figure 6:
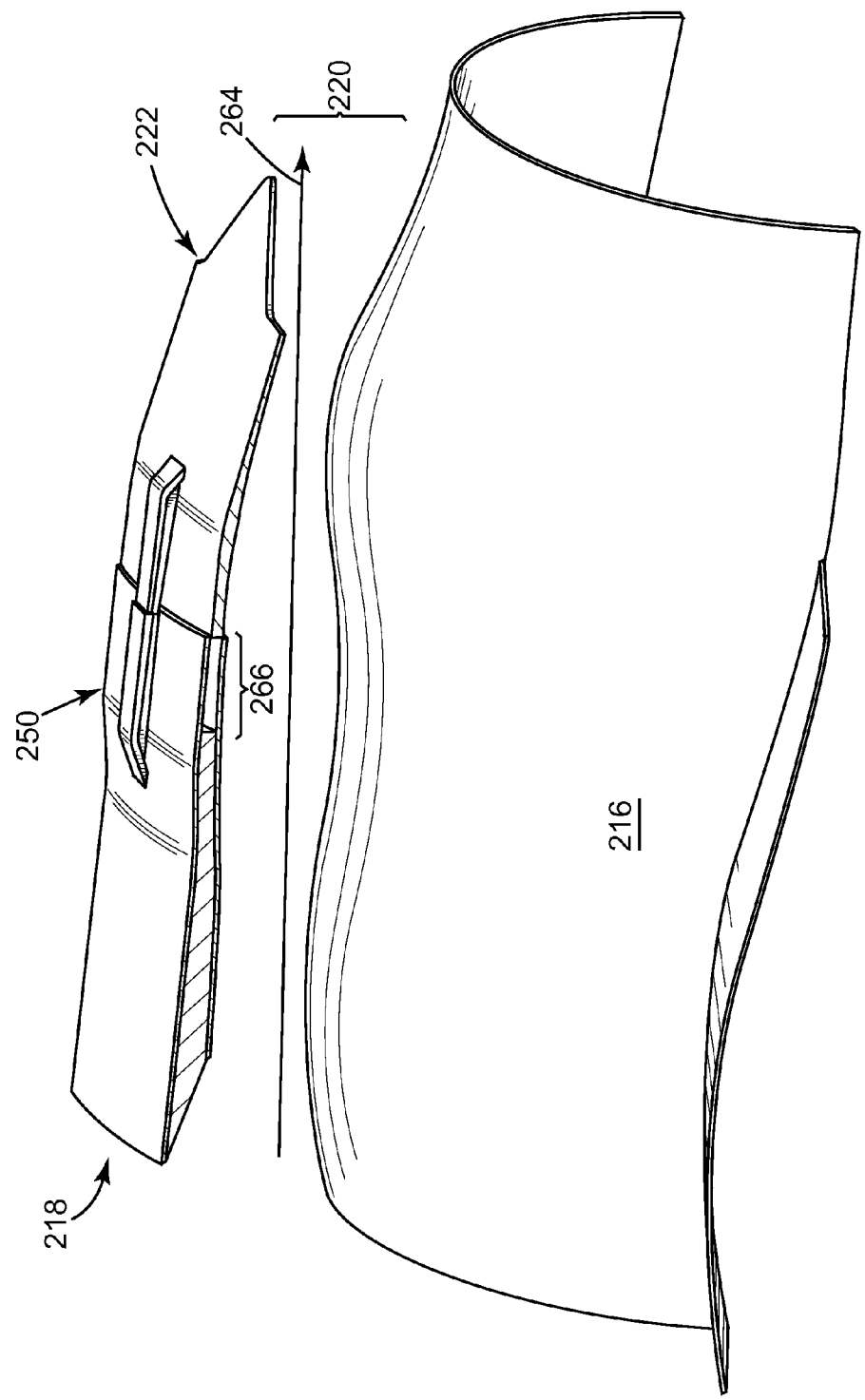
FIG. 6 is a perspective view of the embodiment of the apparatus of FIG. 2, showing the apparatus in a third (aft) position and positioned relative to the core cowling of the jet engine.

FIG. 4 is a perspective view of the embodiment of the apparatus 200 of FIG. 2, showing the apparatus 200 in a first (or "default") position and positioned relative to the inner cowl 216. FIG. 5 is a perspective view of the embodiment of the apparatus 200 of FIG. 2, showing the apparatus 200 in a second (or "forward") position that results after the actuator assembly 226 moves chevron 222 toward the forward end 210. FIG. 6 is a perspective view of the embodiment of the apparatus 200 of FIG. 2, showing the apparatus in a third (or "aft") position. The aft position occurs after the actuator assembly 226 moves the chevron 222 toward the aft end 212 and, in on example, closer to the inner cowl 216.

As FIG. 2 illustrates, the outer cowl 218 (or "thrust reverser translating cowl 218") comprises a first member 228, a second member 230, and a third member 232 disposed therebetween. Near the aft end 212, the outer cowl 218 has a channel 234 that forms a gap or slot between the first member 228 and the second member 230. The outer cowl 218 also comprises a guide feature 236 proximate the channel 234. The guide feature 236 can comprise one or more guide members 238 disposed within the channel 234 and extending longitudinally from the third member 232 toward the aft end 212. The chevron 222 has a base end 240 and a featured end 242 which tapers towards the aft end 212. In one example, the featured end 242 may have a substantially triangular shape when viewed from the top-down or from the bottom-up.

The apparatus 200 also includes a cover assembly to enclose the actuator assembly 226. The cover assembly has a first cover 246 (or "first blister 246") and a second cover 248 (or "second blister 248") affixed to, respectively, the outer cowl 218 and the chevron 222. The cover assembly is generally arranged to minimize disruptions in the air flow through the turbine engine. The shape, size, and other features of the cover assembly prevent damage and wear to the actuator assembly 226, while also taking into consideration fluid dynamics and aerodynamics necessary to promote effective functioning of, e.g., jet engines. In one embodiment, both the first cover 246 and the second cover 248 have longitudinal center axes that substantially align with the longitudinal center axes of the outer cowl 218 and the chevron 222. To permit movement of the actuator assembly 226 and the chevrons 222, the first cover 246 and the second cover 248 can slidably fit together, wherein one the covers (e.g., the first cover 246 and the second cover 248) has an opening that is large enough for the other cover to slidably fit therein.

The base end 240 can comprise one or more receiving features (not shown) such as slots or holes that can receive the guide members 238. The base end 240 likewise can fit into the channel 234 so that the chevron 222 can slidably engage the outer cowl 218. The guide members 238 are useful to prevent radial motion of the chevron 222, either inward towards the engine centerline or outward. These elements also guide the chevron 222 forward and aft, and provide a wear surface that can prevent vibration, air gaps, etc. In other examples, the guide members can also serve other functions including as a mechanism that permits the chevron to return to a position (e.g., the default position) in the event of power low to the linear actuator.

FIG. 2 shows that the second member 230 may extend farther towards the aft end 212 than the first member 228. In one example, the second member 230 may taper in thickness toward the aft end 212. These features can smooth the transition from the second member 230 to the chevron 222 to provide better aerodynamics and related fluid dynamic properties between the outer cowl 218 and the chevron 222. In one embodiment, the outer cowl 218 and/or the base end 240 can comprise interlocking features, in lieu of the individually formed guide members 238, that permit movement of the chevron 222 relative to the outer cowl 218 but also stabilize the chevron 222.

As best shown in FIG. 3, an embodiment of the actuator assembly 226 includes a linear actuator 250, which is preferably an electromagnetic linear motor with a rotor 252 that is slidably coupled with a stator 254. One or more fasteners 256 secure the stator 254 to the outer cowl 218. Suitable linear motors for use as the linear actuator 250 are known and readily available, and thus do not warrant a detailed discussion herein of how they are constructed and function. The actuator assembly 226 also comprises a support structure 258 that secures the linear actuator 250 to the chevron 222.

In one embodiment, the support structure 258 comprises a tang 260, which is affixed proximate the base end 240 of the chevron 222, and a pair of opposing support members 262 secured to the linear actuator 250. The support members 262 form a clevis fitting that can integrate with the tang 260. In one example, a pin 264 couples the support members 262 to the tang 260 such as through openings (e.g., holes, bores, apertures, etc.) present in each of the tang 260 and the support members 262.

In operation, the rotor 252 moves forward and aft in response to electrical current applied to the linear actuator 250 and/or in response to magnetic fields generated by the linear actuator 250. Movement of the rotor 252 directs force to the chevron 222 via, e.g., the support structure 258, to move the chevron 222 forward and aft as prescribed herein. Prior to installation, the linear actuator 250 should be tested and certified for use onboard an jet engine. The linear actuator 250 should also be capable of translating the chevron 222 towards the aft end 212 and into the flow path of combustion gases that the jet engine expels, and capable of operating with high translating forces so as to translate one or more of the chevrons into the gas flow path when the jet engine is in operation.

FIGS. 4, 5, and 6 show the outer cowl 218 and the chevron 222 in relation to the inner cowl 216 of the jet engine. This configuration forms the fan nozzle exit area 220 through which the gases flow in a gas flow path 264. In FIG. 4, the linear actuator 250 and the chevron 222 are in a first (default) position, where a gap distance 266 separates the base end 240 of the chevron 222 from the aft-facing end of the third member 232. In FIG. 5, the linear actuator 250 and the chevron 222 are in a second (also "forward" or "retracted") position, where the gap distance 266 is reduced. In one example, the chevron 222 retracts so the base end 240 mates substantially with the aft-facing surface of the third member 232, thereby forming a hard stop that prevents further movement of the chevron 222 toward the forward end 214. In FIG. 6, the linear actuator 250 and the chevron 222 are in a third (also "aft" or "extended") position, where the gap distance 266 is expanded and the base end 240 of the chevron 222 is proximate the trailing edge of the first member 228 and/or the second member 230. When moved from one the first or second position to the third position, the featured end 242 of the chevron 222 projects, or further projects, into the gas flow path 264 to alter the fan nozzle exit area 220 to achieve optimal fan duct pressures at various points in the flight envelope, which optimal fan duct pressures reduce engine noise and/or improve fuel efficiency.

Figure 7:
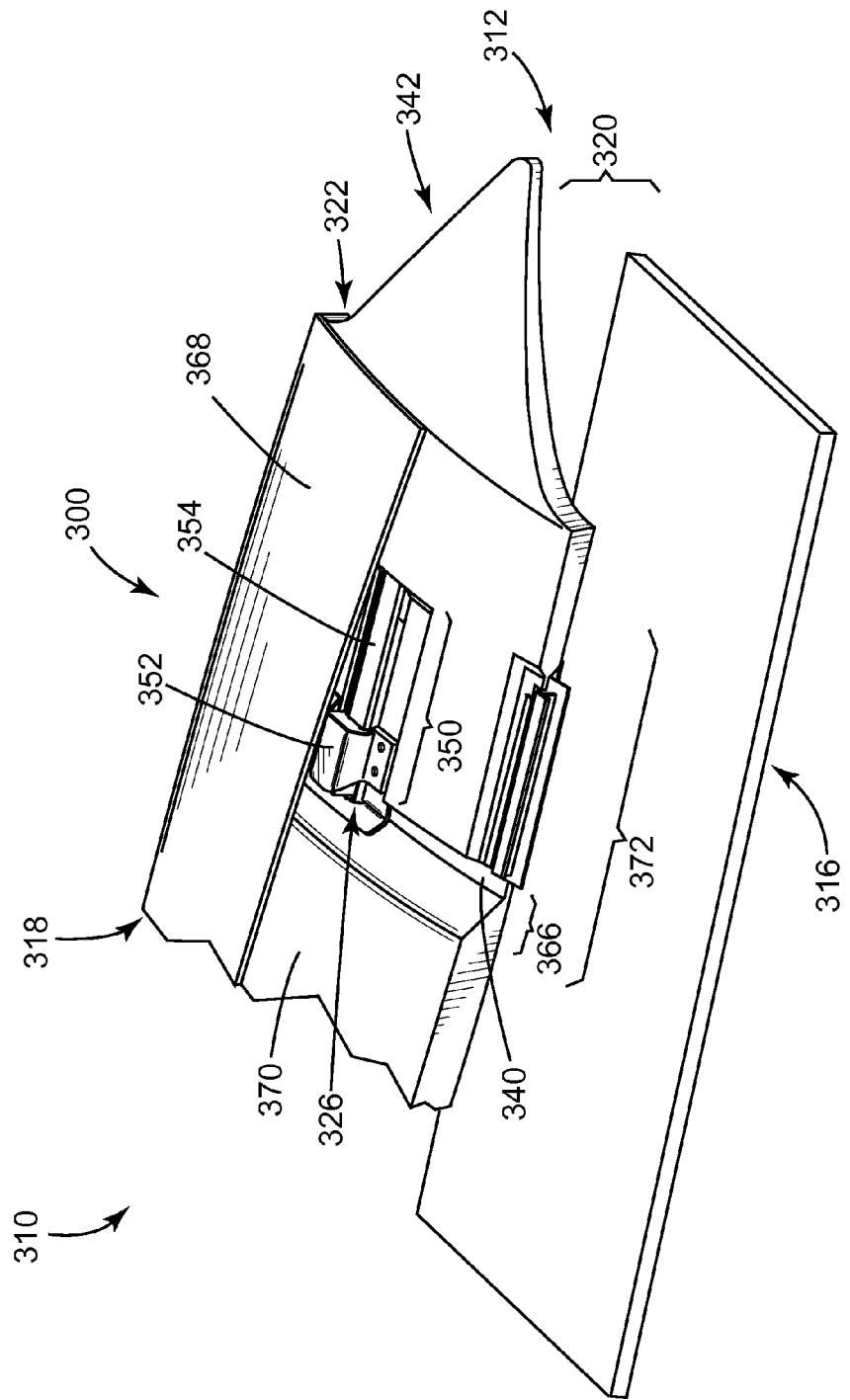
FIG. 7 is a cut-away, perspective view of a second embodiment of an apparatus configured to move a chevron forward or aft to alter a gas flow path of an airfoil for a jet engine.
Figure 8:
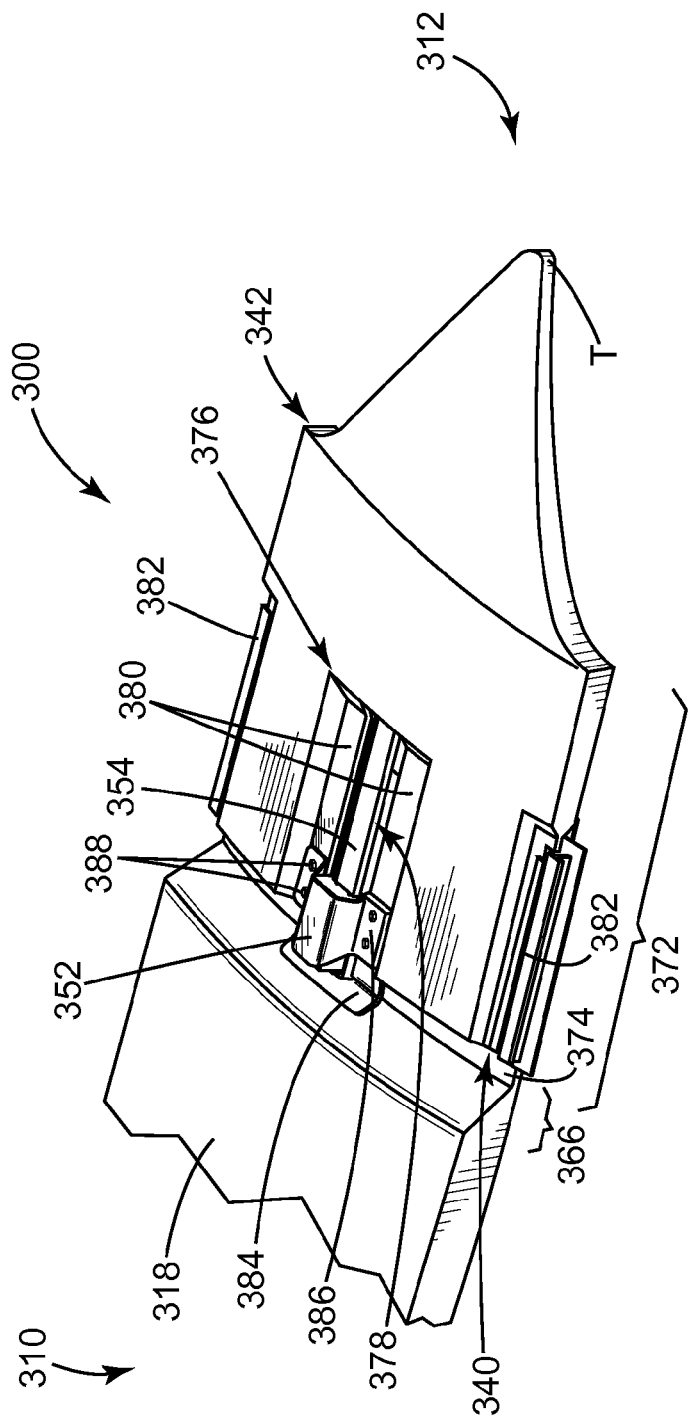
FIG. 8 is a perspective view of the second embodiment of the apparatus of FIG. 7, showing the apparatus in a first (default) position.
Figure 9:
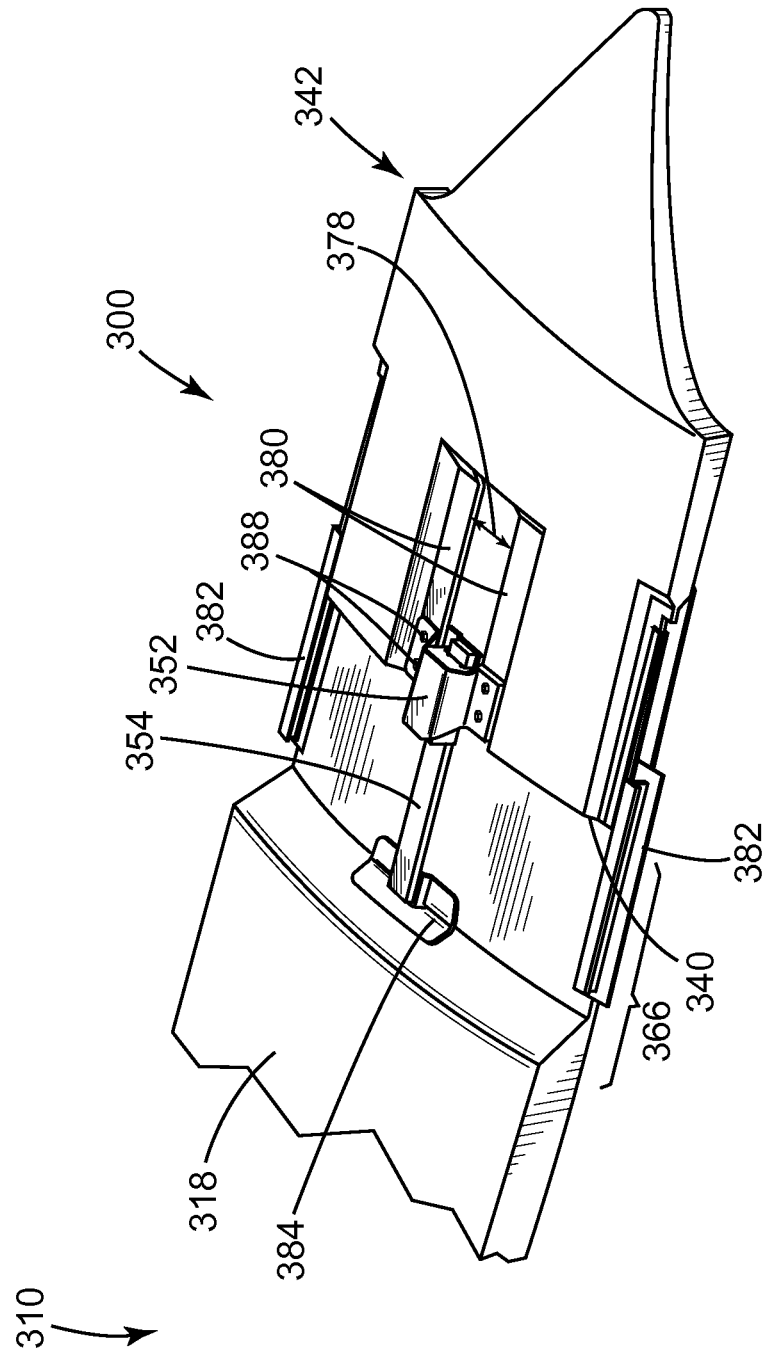
FIG. 9 is a perspective view of the second embodiment of the apparatus of FIG. 7, showing the apparatus in a second (aft) position.

FIGS. 7, 8, 9, and 10 depict a second embodiment of an apparatus 300 for use as the chevron installation 124 (FIG. 1). FIG. 7 shows a cut-away, perspective view of the apparatus 300, which can be generally incorporated as part of the jet engine 102 of FIG. 1. FIG. 8 is a perspective view of the apparatus 300 of FIG. 7, showing the apparatus 300 in a first (or "default") position. FIG. 9 is a perspective view of the second embodiment of the apparatus 300 of FIG. 7, showing the apparatus 300 in a second (or "aft") position.

Referring first to FIG. 7, while the jet engine is not shown in detail, numerals identify certain features that include a forward end 310, an aft end 312, an inner cowl 316, an outer cowl 318, and a fan nozzle exit area 320. The apparatus 300 includes a chevron 322 and an actuator assembly 326, which in this case is a linear actuator 350 with a rotor 352 and a stator 354. The chevron 322 has a base end 340 and a featured end 342 that is narrower in width and/or in thickness than the base end 340. The featured end 342 may be geometrically shaped as shown, so that the trailing edge of the chevron 322 has a pointed tip T. In one embodiment, the chevron 322 is planar, with no curvature. In another embodiment, the chevron 322 is planar with a predetermined curvature such as would direct the pointed tip toward the center line of the jet engine 302.

The outer cowl 318 comprises an outer member 368 and an inner member 370 comprising an area of reduced material thickness 372 extending from the aft end of the outer cowl 318 forward. Configurations of the apparatus 300 forego use of covers and related implements which are found in, e.g., the apparatus 200 above. Rather the components of the apparatus 300 permit the outer cowl 318 and, more particularly, the outer member 368 to house all of the necessary components therein. This configuration further reduces the profile of the apparatus 300 so as to preserve the aerodynamic integrity of the outer cowl 318 as found on, e.g., the jet engine. In one example, the outer cowl 318 may include the channel (e.g., the channel 234 of previous figures), which may be removed to provide an open top forming the area 372.

As best shown in FIG. 8, where the outer member 368 is removed, the area 372 can accommodate entry of the chevron 322, forming in one example a platform surface 374 to which various elements of the actuator assembly can be secured. The chevron 322 also comprises a cavity 376 with a longitudinally extending slot 378, which forms flanges 380. The apparatus 300 also includes guide members 382, a cowl support bracket 384, a chevron support bracket 386, and fasteners 388.

The cavity 376 can be centrally-located relative to the outer edges of the chevron 322. In the present example, the linear actuator 350 resides in the cavity 376 and, more particularly, the rotor 352 sets into the slot 378 and the stator 354 translates along the rotor 352. The guide members 382 are secured to the outer edges of the chevron 322 and proximate the platform area 374 of the outer cowl 318. The guide member 382 may comprise linear bearings that prevent radial and torsional motion of the chevron 322. Generally the guide members 282 guide the chevron 322 forward and aft, and provide a wear surface to prevent vibration, air gaps, etc. In one embodiment, the guide members 382 can attach to flanges or other features such as recesses that are formed along edges of the base end 340 of the chevron 322.

In one embodiment, the cowl support bracket 384 and the chevron support bracket 386 are installed in the area 372 and/or the cavity 376. The brackets secure the linear actuator 350 and effectively react to loads caused by translation of the chevron 322. The cowl support bracket 384 secures the stator 354 (e.g., the stationary track) to the outer cowl 318 to prevent movement of the rotor 352 during actuation of the linear actuator 350. The chevron support bracket 386 can be constructed to secure the rotor 352 to the flanges 380. In one example, the apparatus 300 may include fasteners and suitable bracketry that secure the linear actuator 350 to each of the outer cowl 318 and the chevron 322. In other examples, one or more components of the linear actuator 350 may be integrally formed with the base end 340 of the chevron 322.

Referring to FIGS. 7, 8, and 9, the chevron 322 is installed within the area 372 so that the base end 340 fits within and can translate between the outer member 368 and the platform 374 in the outer cowl 318 (or "translating sleeve" as this element may also be known). In the present example, the linear actuator 350 is also housed within the chevron 322 and enclosed by, e.g., the outer member 368. In FIGS. 7 and 8, the chevron 322 is shown in a nominal position, forming the gap distance 366, and from which the chevron 322 may be actuated either forward or aft to achieve different nozzle throat and acoustic attenuation. For example, when the linear actuator 350 is energized, the chevron 322 translates forward or aft as necessary, altering the relationship of the outer cowl 318 to the inner cowl 316, and in turn altering the diameter of the fan nozzle exit area 320. The degree of changes in this relationship can be defined by the gap distance 366. In FIG. 9, the gap distance 366 increases as the chevron 322 translates aft.

Figure 10:
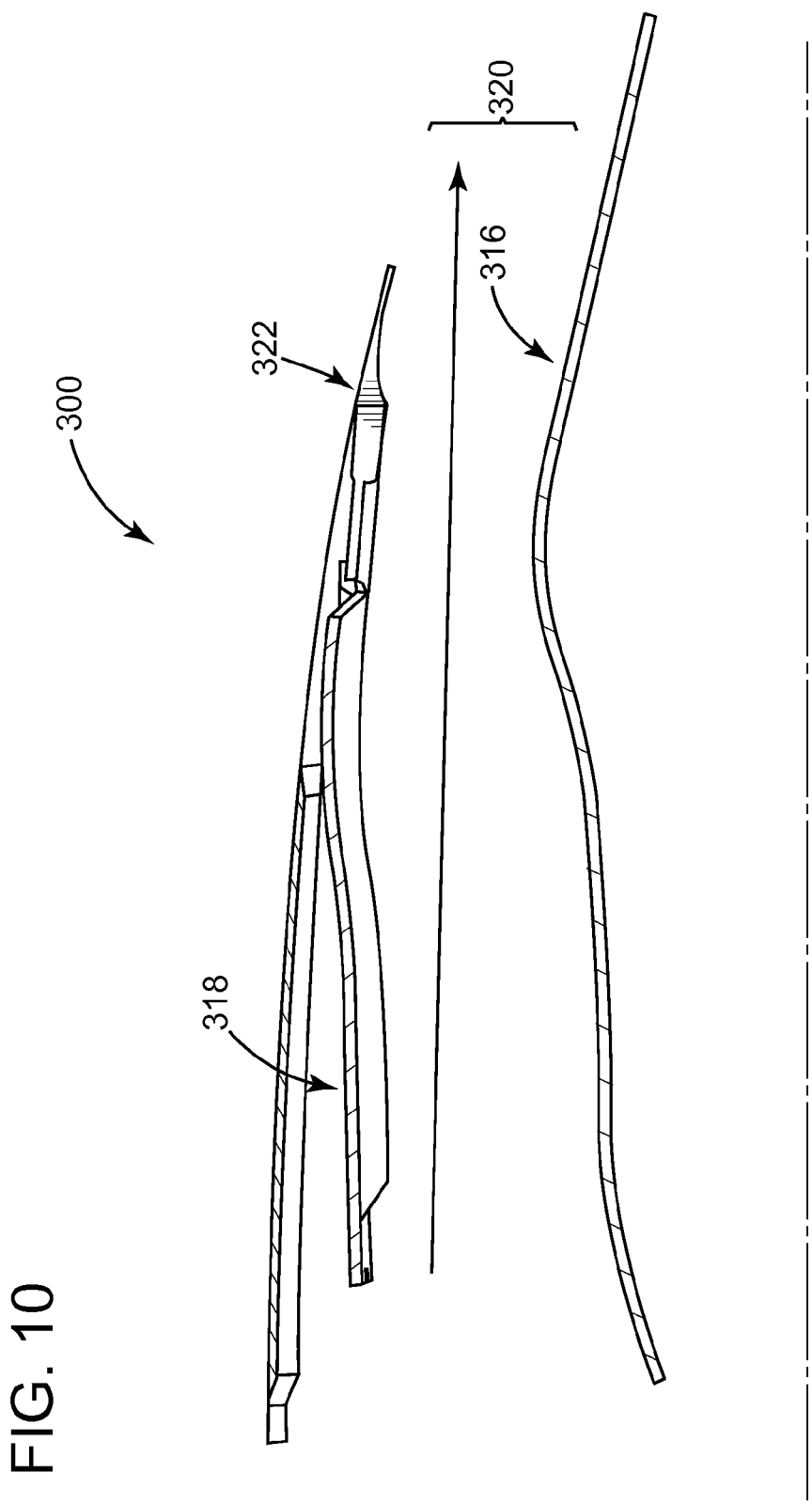
FIG. 10 is a perspective view of the second embodiment of the apparatus of FIG. 7, showing the apparatus in the first (default) position and positioned relative to the core cowling of the jet engine.

FIG. 10 is a perspective view of the apparatus 300 of FIG. 8, showing the apparatus 300 in the first position in relation to the core cowl 316 of the jet engine.

Figure 11:
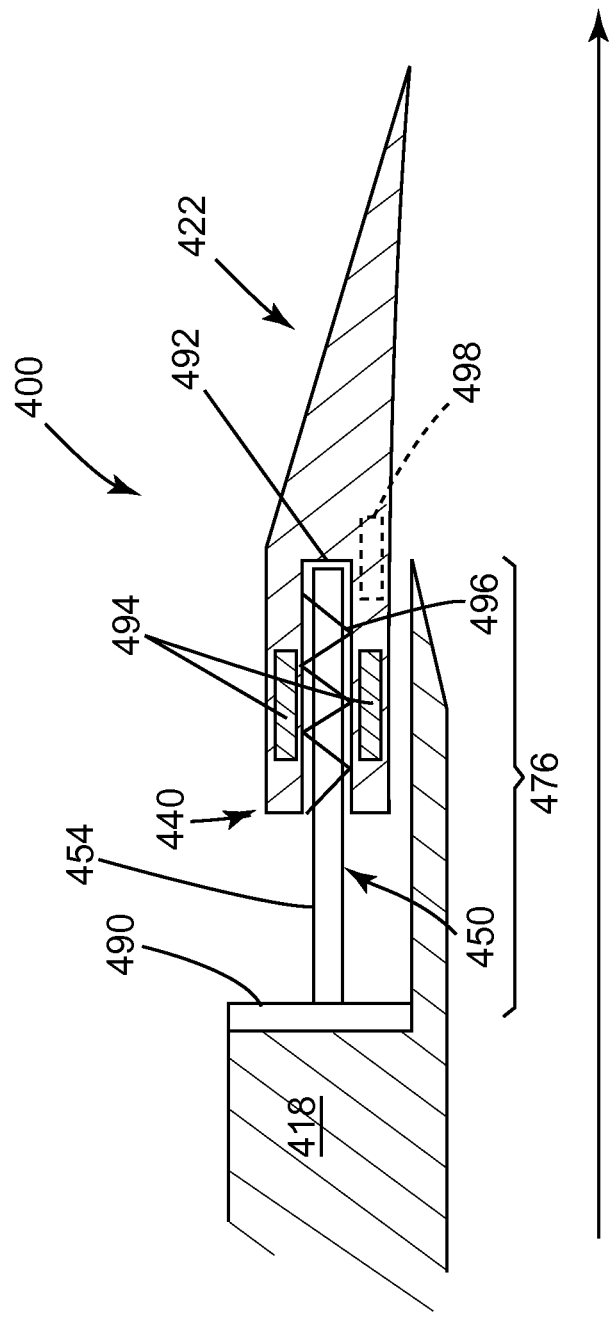
FIG. 11 is a free-body diagram of a third embodiment of an apparatus configured to move a chevron forward or aft to alter a gas flow path of an airfoil for a jet engine.

FIG. 11 is a free-body diagram of a third embodiment of an apparatus 400 configured to move a chevron 422 forward or aft to alter a gas flow path in a jet engine (e.g., the jet engine 102 of previous figures). In FIG. 11, the outer member (e.g., the outer member 218, 318 in prior figures) and guide members (e.g., the guide members 228, 382 in prior figures) of the outer cowl 418 have been omitted for clarity.

More importantly, FIG. 11 illustrates an exemplary construction in which the chevron 422 has a base end 440 that incorporates a component of the linear actuator 450. For example, the apparatus 400 includes a bracket 490 that is housed within the area 476 formed in the aft end of the outer cowl 418 and is attached to the outer cowl 418. The stator 454 of the linear actuator 450 is attached to the support bracket 490 and slidably fits within a channel 492 formed in the base end 440 of the chevron 422. The rotor (not shown) of the linear actuator 450 is integrally formed with the base end 440 of the chevron 422 and includes one or more magnets 494 housed therein. The chevron 422 is retained by a spring 496. One end of the spring 496 attached to the chevron 422; the other is attached to the bracket 490, the stator 454, and/or elsewhere in the area 476 formed in the outer cowl 418. The apparatus 400 may also include a position sensor 498, which is in one example integrally formed in the chevron 422. The position sensor 498 may be coupled to a controller (e.g., a controller 808 in FIG. 17) via a wired connection or wireless connection. In use, the position sensor 498 senses the precise position of at least one of the linear actuator 450 and the chevron 422. The sensor 498 can output data indicative of that precise position to the controller (e.g., the controller 910 in FIG. 16).

Figure 12:
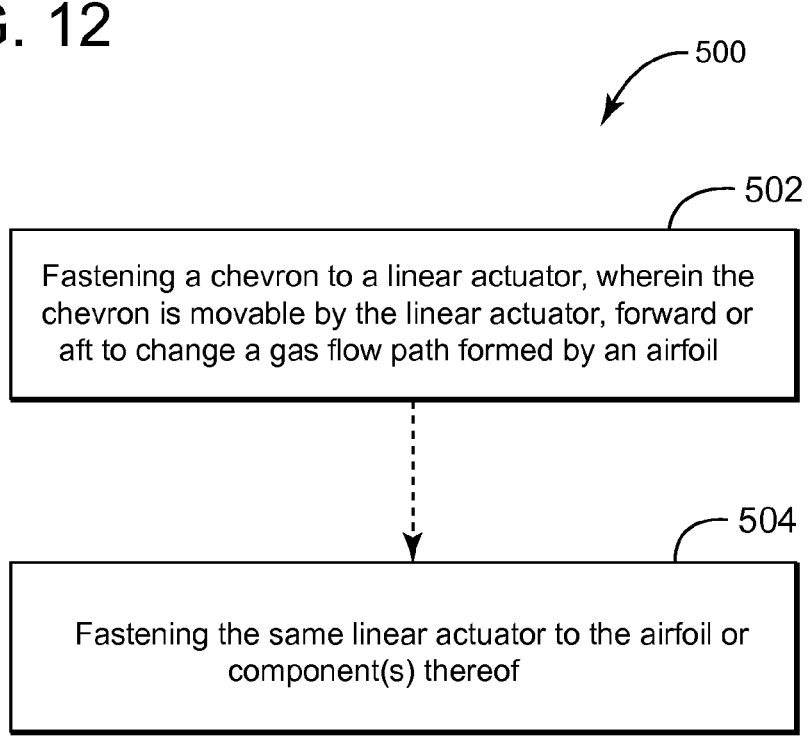
FIG. 12 is a flowchart illustrating an embodiment of a method for manufacturing embodiments of the apparatus of FIGS. 2, 3, 4, 5, 6, 7, 8, 9, 10, and 11.

FIG. 12 is a flowchart illustrating an embodiment of a method 500 for manufacturing embodiments of the apparatus 200, 300, 400 of FIGS. 2, 3, 4, 5, 6, 7, 8, 9, 10, and 11. The method 500 can include, at block 502, fastening a chevron to a linear actuator and, at block 504, fastening the linear actuator to the cowl or other portion of the jet engine.

Generally the method 500 can be used in the manufacture of jet engines at the factory or, in other environments, as a way to equip existing jet engines with one or more of the apparatus discussed above. For new builds, integration of any one of the apparatus 200, 300, and 400 may be better suited. Designs that require integration of specific components may be identified prior to finalization of the design and, thus, one or more components of the jet engine can be specifically manufactured as per specifications of the apparatus 200, 300, and 400. On the other hand, integration of the chevron installation into existing jet engines may require more intensive construction/rebuilding efforts to achieve successful integration. Additional steps may require that the jet engine be taken apart, and that certain components be modified (e.g., by machining, welding, boring, etc.) to accommodate one or more of the components that the present disclosure contemplates herein.

Figure 13:
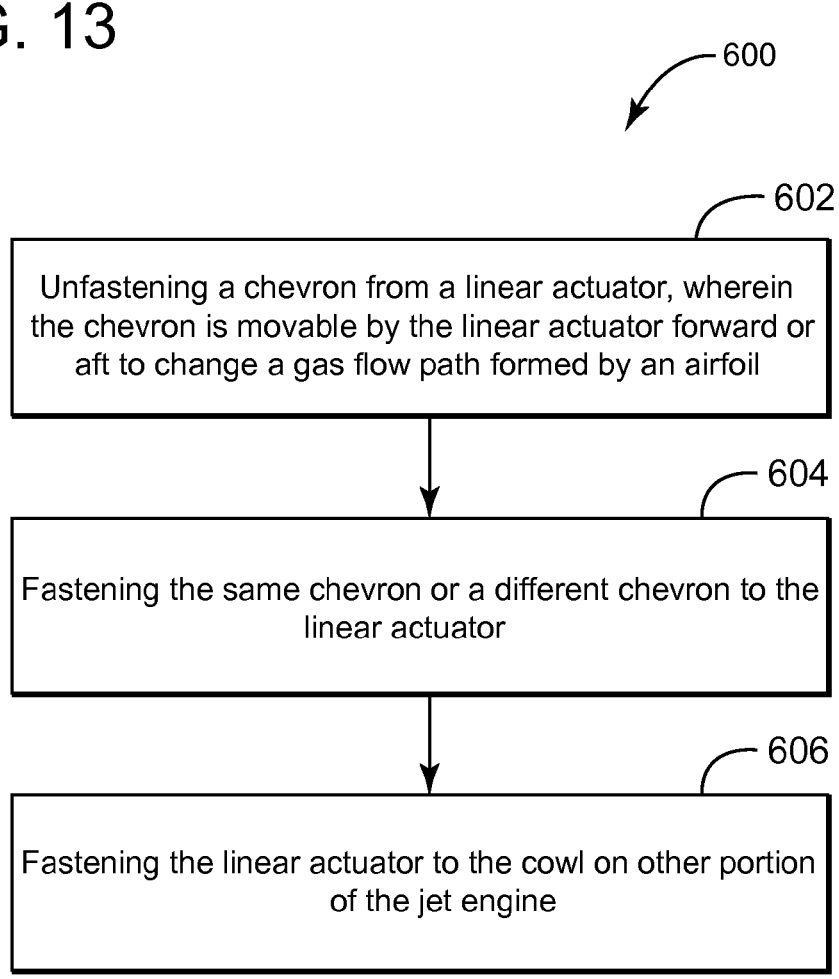
FIG. 13 is a flowchart illustrating an embodiment of a method for maintaining or servicing embodiments of the apparatus of FIGS. 2, 3, 4, 5, 6, 7, 8, 9, 10, and 11.

In connection with servicing and refurbishing of existing jet engines, FIG. 13 is a flowchart that illustrates an embodiment of a method 600 for maintaining or servicing embodiments of the apparatus 200, 300, 400 of FIGS. 2, 3, 4, 5, 6, 7, 8, 9, 10, and 11. The method 600 includes, at block 602, unfastening a chevron from the jet engine from existing structure, at block 604, fastening the same chevron to a linear actuator and, at block 606, fastening the linear actuator to the cowl or other portion of the jet engine.

When dealing with existing engines, it may be likely to encounter chevrons that are previously secured to other components for translation. Existing configurations of the chevrons may, for example, translate and or actuate in different manners and for reasons that are different than those contemplated herein. It may be reasonable to consider the implementation of various other devices that may facilitate the removal and reinsertion of the chevron including, for example, embodiments in which positioning of stanchions and machining tools and equipment is necessary.

Figure 14:
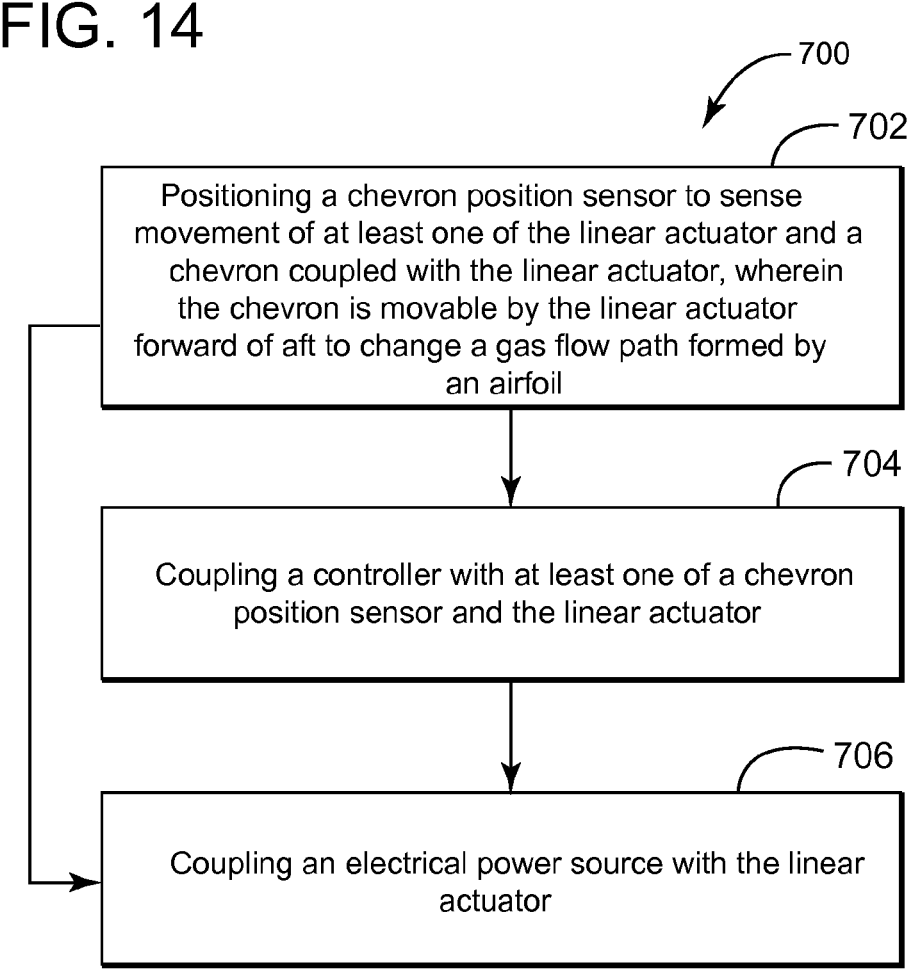
FIG. 14 is a flowchart illustrating an embodiment of a method for installing embodiments of the apparatus of FIGS. 2, 3, 4, 5, 6, 7, 8, 9, 10, and 11 on an aircraft.

FIG. 14 is a flowchart illustrating an embodiment of a method 700 for installing embodiments of the apparatus 200, 300, 400 of FIGS. 2, 3, 4, 5, 6, 7, 8, 9, 10, and 11 on an jet engine. The method 700 includes, at block 702, positioning a position sensor to sense movement of a chevron. The method 700 also includes, at block 704, coupling a controller to the positioning sensor and the linear actuator. The method 700 further includes, at block 706, coupling a power source (e.g., an electrical power source) to the linear actuator.

The method 700 can also include other steps, including steps found in embodiments of the method 500 and 600. At a high level, the positioning sensor is useful to monitor the position of the chevron and, more importantly, to determine how far the chevron extends into the flow path of combustion gases. The position sensor can be, in one example, proximate the chevron and/or a portion of the linear actuator. In other examples, the positioning sensor can be incorporated as part of the linear actuator or other device (e.g., an encoder) that provides inputs suitable for monitoring and determining the location of the chevron as contemplated herein.

Figure 15:
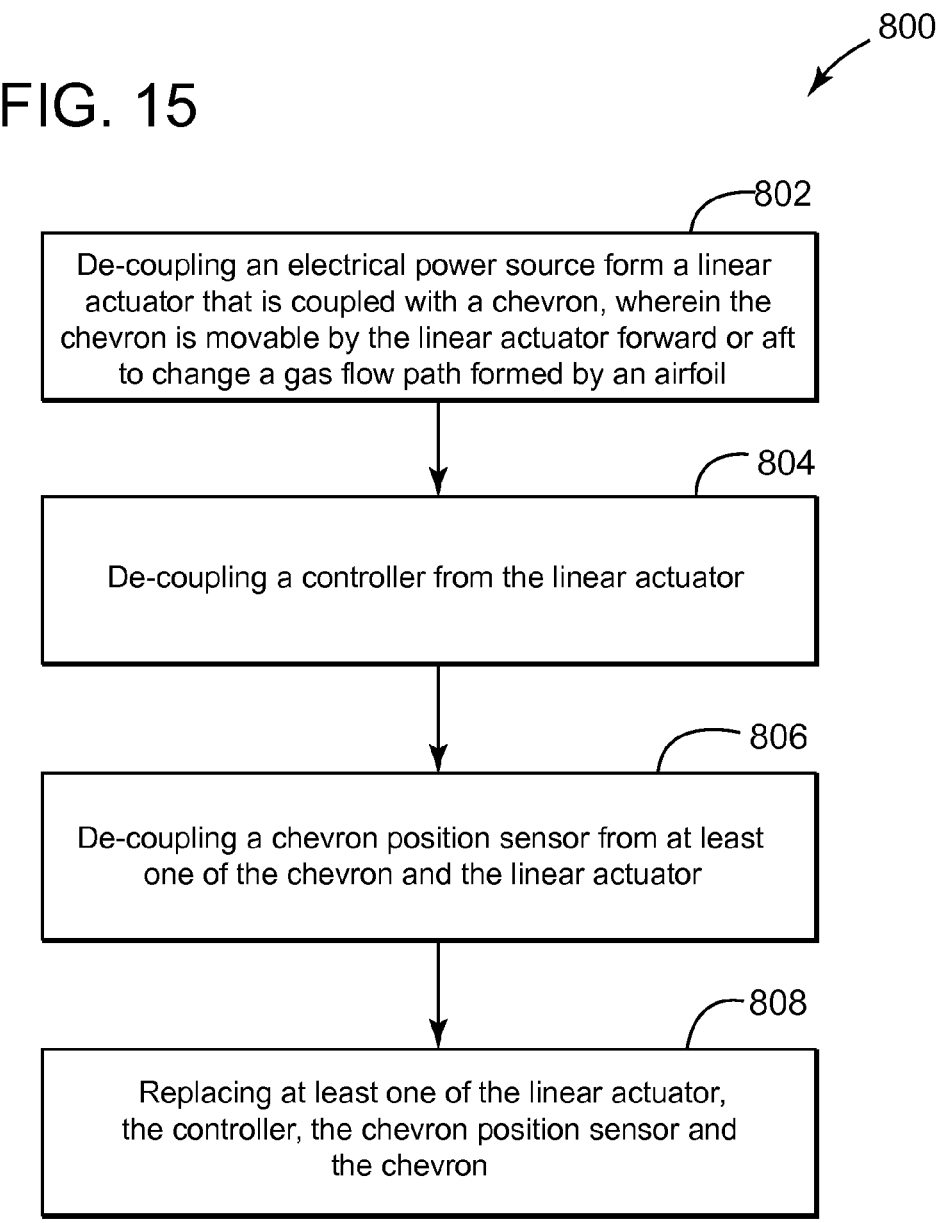
FIG. 15 is a flowchart illustrating an embodiment of a method for maintaining or servicing embodiments of the apparatus of FIGS. 2, 3, 4, 5, 6, 7, 8, 9, 10, and 11 that have been installed on an aircraft.

FIG. 15 is a flowchart illustrating an embodiment of another method 800 for maintaining or servicing embodiments of the apparatus 100, 200, 300 of FIGS. 2, 3, 4, 5, 6, 7, 8, 9, 10, and 11 that have been installed on an aircraft. The method 800 can also be performed in conjunction with the other methods (e.g., the methods 500, 600, 700 or the previous figures) to outfit previously-built jet engines with equipment necessary to provide adjustable chevrons as disclosed herein.

The method 800 includes, at block 802, de-coupling a power source from an actuator and, at block 804, de-coupling a controller from the actuator. The method 800 also includes, at block 806, de-coupling a position sensor from one or more of the controller, chevron, and actuator. The method 800 can further include, at block 808, replacing one or more of the actuator, the controller, the position sensor, and the chevron.

As discussed above, some embodiments of the apparatus 200, 300, 400 may be installed on jet engines with existing hardware for causing movement of the chevrons disposed thereon. Some or all of this hardware may be replaced to facilitate the use of the improved chevron installation of the present disclosure. For example, the actuators may be replaced with linear actuators that provide better performance, accuracy, and a lower profile. The chevrons may not be equipped to interface with the linear actuators thus, in one example, replacement chevrons are provided and installed as necessary. Still other examples of the present disclosure contemplate upgrades to the controller, the power supply, or other elements of the control systems to promote activation and implementation of the apparatuses described above.

Figure 16:
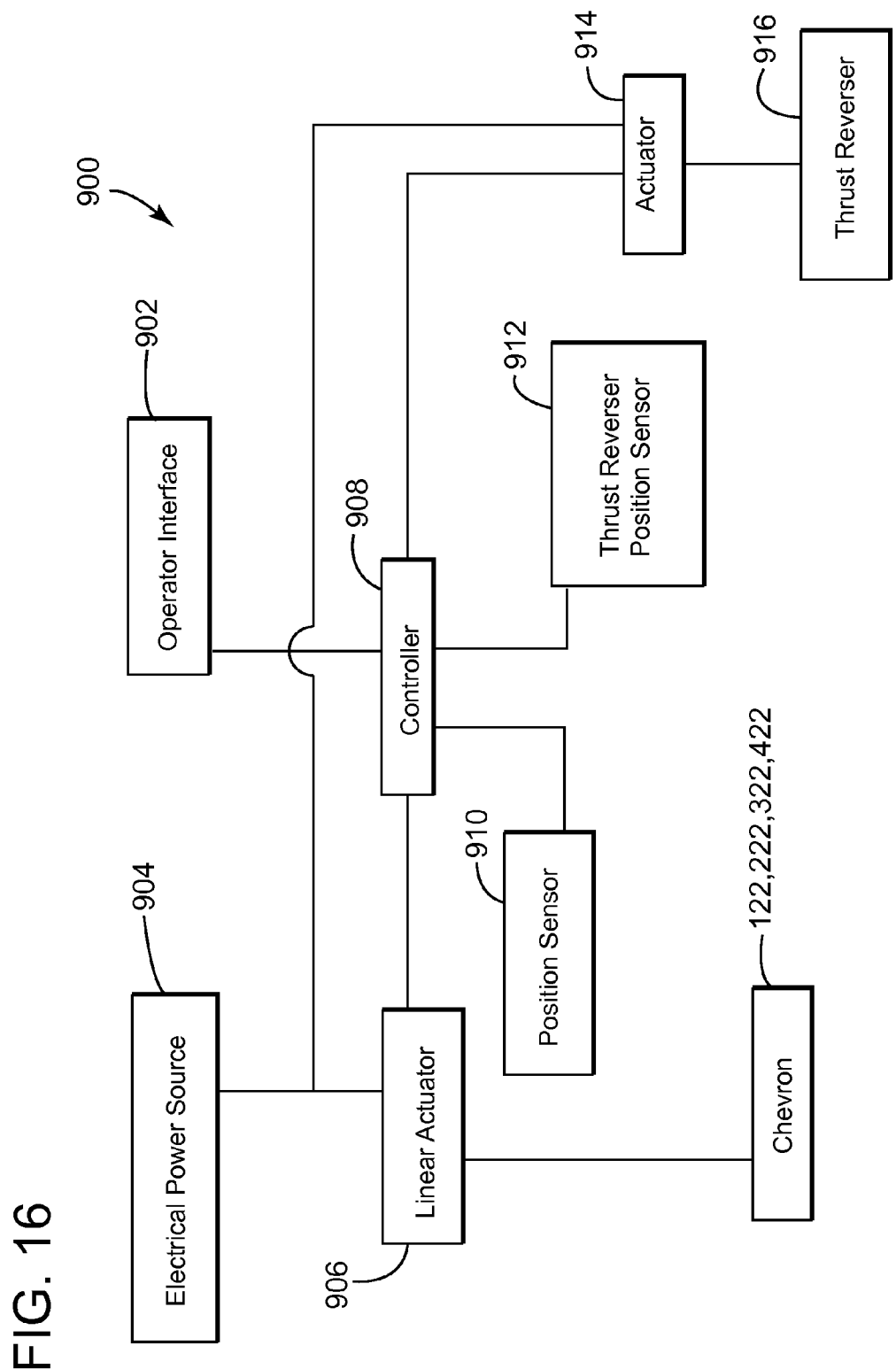
FIG. 16 is a high-level wiring schematic showing how embodiments of the apparatus of FIGS. 2, 3, 4, 5, 6, 7, 8, 9, 10, and 11 are coupled with one or more aircraft Where applicable like reference characters designate identical or corresponding components and units throughout the several views, which are not to scale unless otherwise indicated.

FIG. 16 is a high-level wiring schematic showing how embodiments of the apparatus 200, 300, 400 of FIGS. 2, 3, 4, 5, 6, 7, 8, 9, 10, and 11 are coupled with one or more aircraft components. Generally a variety of control configurations can be used to implement the concepts of the present disclosure. Such control configurations are, more typically, dictated by the control structure of the jet engine and/or the aircraft on which the jet engine is assembled. The example of FIG. 16 provides a schematic diagram of one structure 900 that includes an operator interface 902, a power source 904, a linear actuator 906, and a controller 908. The configuration 900 also includes a position sensor 910, a thrust reverser position sensor 912, an actuator 914, and a thrust reverser 916.

The controller 908 may include various components such as a processor, a memory, and control circuitry configured for general operation of the devices and system on the aircraft, jet engine, and the like. Collectively the parts of the controller 908 execute high-level logic functions, algorithms, as well as firmware and software instructions. In one example, the processor is a central processing unit (CPU) such as an ASIC and/or an FPGA. The processor can also include state machine circuitry or other suitable components capable of receiving inputs from the positioning sensor 910. The memory includes volatile and non-volatile memory and can be used for storage of software (or firmware) instructions and configuration settings. In some embodiments, the processor, the memory, and control circuitry can be contained in a single integrated circuit (IC) or other component. As another example, the processor can include internal program memory such as RAM and/or ROM. Similarly, any one or more of functions of these components can be distributed across additional components (e.g., multiple processors or other components).

The operator interface 902 can be part of a display, such as would be found in the cockpit of an aircraft. The operator interface 902 can provide a graphic user interface ("GUI"). In one example, the GUI identifies the position of the chevron relative to the inner cowl or, in one construction, relative to another fixed location on the jet engine and/or wing. In another example, the configuration 900 may include a flow meter, sensor, or other flow detection device that monitors parameters for the combustion gas exiting the jet engine. This information can be used to determine the correct position of the chevron, and prompt manual and/or automated response to activate the linear actuator and change the position as desired.

A small sample of exemplary embodiments follows below in which:

In one embodiment, a chevron comprising a featured end that tapers to a pointed tip and a base end comprising a cavity, the cavity comprising a slot configured to receive a component of a linear actuator therein.

In one embodiment, the chevron of paragraph [0068], wherein the chevron is further configured to be secured to one or more linear slides.

In one embodiment, the chevron of claim [0068], wherein the base end comprises a slot to receive a guide member therein.

In one embodiment, a thrust reverser translating cowl comprising an aft end with a channel, wherein the channel is sized to receive a base end of a chevron therein.

In one embodiment, the thrust reverser translating cowl of paragraph [0071], wherein the channel is formed between a first member and a second member.

In one embodiment, the thrust reverser translating cowl of paragraph [0071], wherein the channel has an open top end forming an area of reduced diameter at the aft end.

In one embodiment, a method to secure a chevron to a jet engine, said method comprising fastening the chevron to a linear actuator and fastening the linear actuator to an outer cowl of the jet engine, wherein the chevron is movable by the linear actuator forward or aft to change the position of the chevron relative to a gas flow path formed by the outer cowl and an inner cowl of the jet engine.

In one embodiment, the method of paragraph [0074], further comprising unfastening the chevron from the jet engine and replacing an actuator with the linear actuator.

In one embodiment, the method of paragraph [0074], wherein the linear actuator is secured to each of the outer cowl and the inner cowl.

In one embodiment, the method of paragraph [0074], wherein the chevron has a base end that fits within a channel of the outer cowl.

It is contemplated that, where applicable in the present disclosure, numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

This written description uses examples to disclose embodiments of the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus for positioning a chevron, said apparatus comprising:
    a linear actuator;
    a chevron having a base end configured to fit within a corresponding channel on a translating cowl;
    a pair of guide members secured to the translating cowl and slidably engaged with opposite edges of the chevron,
    wherein the chevron is movable by the linear actuator forward or aft to change the position of the chevron relative to the gas flow path, and
    wherein the chevron comprises a slot that is sized and configured to receive a rotor of the linear actuator therein.

2. The apparatus of claim 1, wherein the guide members comprise a linear slide.

3. The apparatus of claim 1, further comprising:
    a housing, assembly that can be secured to each of the outer cowl and the chevron, wherein the housing assembly encloses the linear actuator therein.

4. The apparatus of claim 1, further comprising:
    a position sensor coupled to a controller on an aircraft, the position sensor configured to output data to the controller indicative of a position of the linear actuator and/or a position of the chevron.

5. An apparatus for changing a gas flow path formed in a jet engine by an inner cowl and an outer cowl, comprising:
    a chevron having a base end configured to fit within a corresponding channel on a translating cowl;
    a linear actuator coupled to the chevron and to the translating cowl of the jet engine,
    wherein the chevron is translatable by the linear actuator forward or aft to change the position of the chevron relative to the gas flow path, and
    wherein the chevron comprises a slot that is sized and configured to receive a rotor of the linear actuator therein.

6. An apparatus for changing a gas flow path formed in a jet engine by an inner cowl and an outer cowl, said apparatus comprising:
    a chevron;
    a linear actuator coupled to the chevron and to an outer cowl of the jet engine;
    a tang disposed on the chevron, wherein the tang forms a clevis fitting with opposing structural members of the linear actuator; and
    a housing assembly,
    wherein the housing assembly comprises a first housing coupled to an outer surface of an outer member of said outer cowl, and
    wherein the housing assembly comprises a second housing that is coupled to an outer surface of the chevron, and
    wherein the second housing slidably fits with the first housing, and
    wherein the chevron is movable by the linear actuator forward or aft to change the position of the chevron relative to the gas flow path.

7. The apparatus of claim 6, further comprising a controller coupled with the linear actuator.

8. The apparatus of claim 7, further comprising a position sensor coupled with the controller and configured to output data to the controller indicative of a position of the linear actuator and/or a position of the chevron.

9. The apparatus of claim 6, wherein in a first position, the chevron is disposed substantially parallel to the gas flow path to attenuate drag and/or loss of engine thrust.

10. The apparatus of claim 9, wherein in a second position, the chevron is translated aft to project into the gas flow path.

11. An apparatus for positioning a chevron, said apparatus comprising:
    a linear actuator;
    a chevron having a base end configured to fit within a corresponding channel on a translating cowl;
    a guide member secured to the translating cowl and the chevron;
    a support structure that forms a clevis fitting with the chevron; and
    a housing assembly,
    wherein the housing assembly comprises a first housing coupled to an outer surface of an outer member of said translating cowl, and
    wherein the housing assembly comprises a second housing that is coupled to an outer surface of the chevron, and
    wherein the second housing slidably fits with the first housing, and wherein the chevron is movable by the linear actuator forward or aft to change the position of the chevron relative to the gas flow path.

12. The apparatus of claim 11, wherein the support structure comprises opposing structural members and a pin that interfaces with a tang disposed on the chevron.

13. A translating cowl comprising:
a chevron;
a linear actuator coupled with the chevron; and
a housing assembly coupled to the chevron,
wherein the housing assembly is configured to house the linear actuator and to permit translation of the linear actuator to extend and retract the chevron relative to the gas flow path,
wherein the chevron is movable by the linear actuator forward or aft to change the position of the chevron relative to the gas flow path,
wherein the housing assembly comprises a first housing coupled to an outer surface of an outer member of said translating cowl, and
wherein the housing assembly comprises a second housing that is coupled to an outer surface of the chevron, and wherein the second housing slidably fits within the first housing.

14. The translating cowl of claim 13, further comprising a controller coupled With the linear actuator.

15. The translating cowl of claim 14, further comprising;
a position sensor coupled with the controller and configured to output data to the controller indicative of a position of the linear actuator and/or a position of the chevron.

16. The translating cowl of claim 13, wherein in a first position, the chevron is disposed substantially parallel to the gas flow path to attenuate drag and/or loss of engine thrust.

17. The translating cowl of claim 16, wherein in a second position, the chevron is translated aft to project into the gas flow path.

18. The translating cowl of claim 13, wherein the linear actuator is coupled with an outer member of the translating cowl.

19. The translating cowl of claim 18, wherein the chevron has a base end that is disposed in a channel formed between the outer member and an inner member of the translating cowl.

* * * * *

UNITED STATES PATENT AND TRADEMARK OFFICE
CERTIFICATE OF CORRECTION

| | | |
|---|---|---|
| PATENT NO. | : 8,613,398 B2 | Page 1 of 1 |
| APPLICATION NO. | : 13/163463 | |
| DATED | : December 24, 2013 | |
| INVENTOR(S) | : Calder et al. | |

It is certified that error appears in the above-identified patent and that said Letters Patent is hereby corrected as shown below:

In the Specification

In Column 3, Line 4, delete "aircraft;" and insert -- aircraft; and --, therefor.

In Column 8, Line 44, delete "controller 910" and insert -- controller 908 --, therefor.

In the Claims

In Column 11, Line 65, in Claim 3, delete "housing," and insert -- housing --, therefor.

In Column 14, Line 2, in Claim 9, delete "With" and insert -- with --, therefor.

Signed and Sealed this
Eleventh Day of March, 2014

Michelle K. Lee
*Deputy Director of the United States Patent and Trademark Office*